Patented Oct. 26, 1926.

1,604,199

UNITED STATES PATENT OFFICE.

LORIN B. SEBRELL, OF AKRON, OHIO, ASSIGNOR TO THE GOODYEAR TIRE & RUBBER COMPANY, OF AKRON, OHIO, A CORPORATION OF OHIO.

ACCELERATOR FOR THE VULCANIZATION OF RUBBER AND METHOD OF MAKING THE SAME.

No Drawing.   Application filed April 4, 1924.   Serial No. 704,159.

My invention relates to accelerators for the vulcanization of rubber and rubber compounds, and it has, for its primary object, the provision of a method which shall be especially efficient for the production of such materials.

It has been suggested heretofore that certain thiazole compounds provide efficient accelerators for the vulcanization of rubber. These accelerators are especially desirable because of their power, since they possess an ability to promote the vulcanization of rubber much more rapidly than many accelerators now known. By reason of this ability, it is possible, if desired, to reduce the temperature of vulcanization, which has been found to improve the physical characteristics of the vulcanized rubber. Moreover, certain of the thiazoles also appear to improve the aging characteristics of rubber or rubber compounds, which, of course, is a particularly desirable feature.

The principal object of my invention is to provide a method which shall result in production of the several mercaptobenzothiazoles to the exclusion of products of side reactions, which are not desirable. For example, in the formation of 1-mercaptobenzothiazole from a reaction of aniline, carbon disulfide and sulfur, it is possible for the reaction to go in two different ways, one of which results in the production of anilidobenzothiazole, which is an alkali insoluble compound that has no accelerating effect upon rubber if compounded therewith. Consequently, it is desirable to avoid the production of this material in conjunction with the formation of mercaptobenzothiazole. The reaction of aniline, carbon disulfide and sulfur is indicated by the following formulæ:

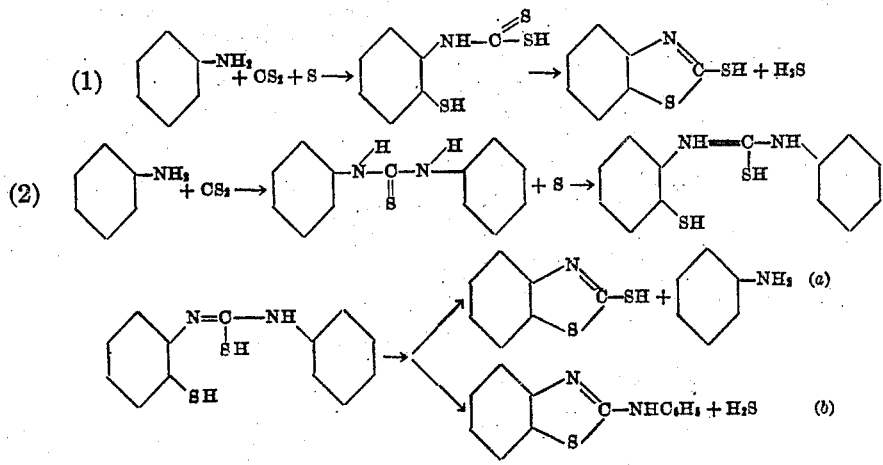

The first equation indicates the manner in which the reaction may go to produce 1-mercaptobenzothiazole without the formation of anilidobenzothiazole, whereas the reaction may also go in two ways, as indicated by (a) and (b) in equation (2), by one of which the 1-anilidobenzothiazole is produced. In consequence of the possibility of the reaction occurring in two ways, this method of producing the desired accelerator of the mercaptobenzothiazole series may be criticized from a production standpoint, since, in some cases, as with the 1-mercapto-3-methyl-benzothiazole, the amount of such side reaction product is quite large, forming, in some experiments, as high as 60% of the total product.

The primary feature of my invention is to first form a stable compound from the amine, which is initially utilized to produce the particular mercaptobenzothiazole, and subsequently, to cause a reaction with this stable compound and sulfur to form the product desired. By first forming a stable compound, in many cases, it is possible to secure higher yields of the desired mercaptobenzothiazole derivative, because undesirable by-products are not formed. My method of producing accelerators applies equally well to mercaptobenzothiazoles other than the one mentioned, namely, 1-mercaptobenzothiazole.

It has been mentioned that a mixture of aniline, carbon disulfide and sulfur may be heated under pressure to produce 1-mercaptobenzothiazole, and, in contradistinction to this, my method consists in forming ammonium phenyl-dithiocarbamate, which is a fairly stable compound when prepared in the presence of strong ammonium hydroxide. If recrystallization from strong ammonium hydroxide is effected, long hexagonal crystals are formed, which, when washed and dried, may be kept indefinitely without decomposition, that is, if moisture is excluded therefrom. The ammonium phenyl-dithiocarbamate may then be intimately mixed with one molar equivalent of sulfur, and placed in an autoclave, where heat and pressure are applied to produce 1-mercaptobenzothiazole. It is, of course, possible, also, to produce the thiazole by merely admixing ammonia, as a gas or dissolved in water, with phenyldithiocarbamic acid and sulfur, and heating the mixture in an autoclave, or other suitable vessel. This is, of course, a more direct method, and will produce very satisfactory results, probably being the manner in which the accelerators will be manufactured in commercial quantities. However, substantially the same reactions occur, namely, the ammonium salt is formed, which then reacts with sulfur to produce the mercaptobenzothiazole. This reaction may be represented as follows:

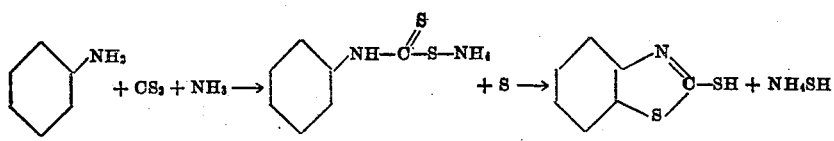

The temperature and pressure, that obtain in the production of the material, may vary over wide ranges, with no substantial difference in the result obtained. If the pressure is not relieved by permitting hydrogen sulfide to escape, which is formed during the reaction, it will rise quite high. For example, in the production of the accelerator, indicated in the above equation, with a maximum temperature of 224° C., the pressure rises to 1000 lbs. per sq. inch. However, it is desirable, if not essential, that the temperature be at least 100° C. to secure satisfactory results, and a pressure of at least 100 lbs. per sq. inch is also necessary to secure a yield of material within the scope of practical operation. Somewhat higher temperatures and pressures will be found more efficient, but the last mentioned are operative. For example, I have found that very satisfactory results may be obtained by employing a temperature of between 175° C. and 250° C., which will probably result in a pressure in the neighborhood of 600 to 1000 lbs. per sq. inch. The material is subjected to heat until the rate of increase in pressure becomes substantially constant, which indicated that the reaction has fully occurred.

The zinc salt of phenyldithiocarbamic acid may also be employed to form, by reaction with sulfur, 1-mercaptobenzothiazole, and very efficient production of the material will result. As a matter of fact, zinc may be utilized to replace ammonia in the production of all the mercaptobenzothiazoles mentioned herein, although I prefer the ammonium salts in general. With the zinc salts, higher temperatures may be utilized, with lower pressures in pounds per sq. inch being established. For example, as compared with 1000 lbs. per sq. inch accompanying a temperature of 224° C. with the ammonium salt, a temperature of 247° C. with the zinc salt results in approximately 575 lbs. per sq. inch being established. It has been found that the foregoing methods result in high yields of the 1-mercaptobenzothiazole.

It should be noted that the sodium or potassium salts of the various aryl dithiocarbamic acids may be employed to form the thiazoles mentioned herein. These constitute examples of monovalent metallic salts that may be utilized in addition to the bivalent metallic salts, such as zinc and lead. The sodium and potassium salts are employed in the same manner as the zinc and ammonium salts, and consequently, descriptions of reactions embodying the latter may be applied to the former.

In the production of 1-mercapto-3-methyl-benzothiazole, an ammonium salt of ortho-tolyl-dithiocarbamic acid, or a zinc salt of the same acid, is employed to produce this accelerator. Substantially the same respective temperatures and pressures may be employed in the reaction of these materials with sulfur to produce the accelerator, but, as aforementioned, wide variations in the temperature and pressure may exist, without detrimental effect upon an efficient production of material.

In the production of 1-mercapto-4-methyl-benzothiazole, the ammonium or zinc salt of meta-tolyl-dithiocarbamic acid is employed. To obtain 1-mercapto-5-methyl-benzothiazole, the ammonium or zinc salt of para-tolyl-dithiocarbamic acid is utilized to react with sulfur. The last three mentioned mercaptobenzothiazoles have been previously suggested as being good accelerators, but the particular method of their production, by utilizing the ammonium or zinc salt of the corresponding aryl dithiocarbamic acid, has not been contemplated to the best of my knowledge.

I have discovered another mercaptothiazole which has not been mentioned heretofore, and one that provides exceptionally goods results in the vulcanization of rubber or rubber compounds. 1-mercapto-3-5-dimethyl-benzothiazole is a new compound which has not been discussed heretofore, and it may be formed from the ammonium or zinc salt of ortho-para-xylyl-dithiocarbamic acid, derived from 4-amino-metaxylene or technical xylene, in a reaction with sulfur under the influence of heat and pressure, in conformity with the foregoing methods of producing the other thiazoles. The temperatures and pressures may, as with the other materials, vary over wide ranges, but in this instance, as in the others, it is preferable to employ a temperature in excess of 100° C., and I have obtained efficient results with a temperature in the neighborhood of 250° C. with either the zinc or ammonium salt. The pressure resulting from the ammonium salt reaction will be probably from 1000 lbs. to 1200 lbs. per sq. inch, and, with the zinc salt, a somewhat lower pressure will be established. These pressures are established, of course, if hydrogen sulfide is not released during the reaction, but lower pressures may be employed by releasing some of the hydrogen sulfide, without detrimental effect on the production, or the percentage of yield. For instance, if the pressure be maintained at approximately 700 to 800 lbs. per sq. inch, good results may be attained.

Another accelerator which is also new in the art, to the best of my knowledge, is 1-mercapto-5-ethoxybenzothiazole. This latter accelerator may be formed from the reaction of sulfur with the ammonium or zinc salt of para-phenetyl-dithiocarbamic acid.

Still another new compound of this general class of accelerators, 1-mercapto-5-methoxybenzothiazole, may be formed from the reaction of ammonium or zinc salt of para-methoxy-phenyl-dithiocarbamic acid with sulfur.

As an example of a use of the new mercaptobenzothiazoles mentioned herein, the following compound may be employed with any of the last three accelerators mentioned, in substantially the proportions set forth:—

100 parts rubber, 5 parts zinc oxide, 3.50 parts sulfur, 1.00 parts of the 1-mercaptobenzothiazole or its analogs.

The foregoing compound may be vulcanized at a temperature corresponding to 40 lbs. of steam pressure in from 5 minutes to 1 hour, depending upon the thiazole used. A temperature corresponding to 20 lbs. of steam pressure may also be used, but the time of cure is increased as a result. For more detailed information, reference may be made to the October 1923 publication of Industrial and Engineering Chemistry, vol. 15, page 1009.

The zinc, lead, cadmium, mercury and ammonium salts of the last three thiazoles may be utilized to advantage in promoting the vulcanization of rubber compounds. The reaction products of these thiazoles, with various bases, both organic and inorganic, may also be employed in such capacity. The disulfides and polysulfides of these thiazoles also constitute accelerators of high power, and the example above given will serve to illustrate a suitable method of employing any of the accelerators. Of course, the proportions given may be varied somewhat, depending upon whether a very fast curing compound is desired, or one that cures or vulcanizes at a moderate rate. The sodium or potassium salts of these accelerators may be employed and such salts are examples of monovalent metallic salts as distinguished from the bivalent metallic salts above mentioned.

In order to explain the method of nomenclature, which is in modern form, according to the American system (see C. A. decennial index), 1-mercapto-3-5-dimethylbenzothiazole is written in its structural form as follows:

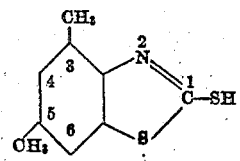

The other thiazoles are named in the same fashion.

It will be appreciated that the method of producing the various thiazoles is broadly concerned with the employment of the ammonium and various metallic salts of the corresponding aryl dithiocarbamic acids, which must be employed to produce the particular thiazole desired. Although the method contemplates the utilization of heat and pressure, it will be appreciated that no exact limits can be practically specified. It is sufficient to note that a temperature of at least in excess of 100° C. is desirable, if not necessary, and that a pressure of at least 100 lbs. per sq. inch should be utilized. However, the pressure may mount as high as 2000 lbs. or 3000 lbs. per sq. inch, depending upon whether such pressures are practical with the apparatus that may be employed. It is, of course, somewhat more practical to utilize a suitable temperature, such, for example, in the neighborhood of 250° C. to 300° C., and allowing the pressure to mount to about 700 to 800 lbs. per sq. inch. Ordinarily the pressure is relieved at intervals to maintain it nearly constant, and when the rate of increase thereof becomes practically constant, the reaction is complete. However, if desired, temperatures as high as 350° C. to 400° C. may be employed, but probably the pressure would have to be reduced from that established by such temperature. The temperatures are, of course, limited to such as will not destroy the material by charring.

Although I have specifically described a method of forming various thiazoles, it will be appreciated that the exact procedure set forth may be subject to minor changes, and that the materials named may suggest other materials that may be employed within the scope of my invention. I desire, therefore, that no limitations shall be imposed, except such as are indicated in the appended claims.

What I claim is:

1. A method of producing a mercapto-benzothiazole which comprises forming a salt of an aryl dithiocarbamic acid, admixing sulfur therewith, heating the mixture to a temperature of between 100° C. and 400° C. and maintaining a pressure of not less than 100 lbs. per sq. in. nor more than 3000 lbs. per sq. in.

2. A method of producing a mercapto-benzothiazole which comprises forming a monovalent salt of an aryl dithiocarbamic acid, admixing sulfur therewith, heating the mixture to a temperature of between 100° C. and 400° C. and maintaining a pressure of not less than 100 lbs. per sq. in. nor more than 3000 lbs. per sq. in.

3. A method of producing a mercapto-benzothiazole which comprises forming an ammonium salt of an aryl dithiocarbamic acid, admixing sulfur therewith, heating the mixture to a temperature of between 100° C. and 400° C. and maintaining a pressure of not less than 100 lbs. per sq. in. nor more than 3000 lbs. per sq. in.

4. A method of producing 1-mercapto-3-methyl-benzo-thiazole which comprises admixing ammonium o-tolyl-dithiocarbamate with sulfur heating the mixture to a temperature between 175° C. and 300° C. and maintaining a pressure between 500 and 1000 lbs. per sq. in.

5. A method of producing mercapto aryl thiazoles which comprises forming a salt of the corresponding aryl dithio carbamic acid, mixing sulfur therewith and subjecting the mixture to a positive pressure and an elevated temperature not to exceed the decomposition temperature of the product.

In witness whereof, I have hereunto signed my name.

LORIN B. SEBRELL.